March 21, 1967 D. E. RUCH 3,310,730

CIRCUIT FOR APPROXIMATING A DESIRED WAVEFORM ACROSS A LOAD

Filed June 19, 1963 2 Sheets-Sheet 1

INVENTOR.
David E. Ruch
BY
Paul J. Ethington
ATTORNEY

March 21, 1967 D. E. RUCH 3,310,730
CIRCUIT FOR APPROXIMATING A DESIRED WAVEFORM ACROSS A LOAD
Filed June 19, 1963 2 Sheets-Sheet 2

INVENTOR.
David E. Ruch
BY
Paul J. Ethington
ATTORNEY

United States Patent Office 3,310,730

Patented Mar. 21, 1967

3,310,730

CIRCUIT FOR APPROXIMATING A DESIRED WAVEFORM ACROSS A LOAD

David E. Ruch, Playa del Rey, Calif., assignor to General Motors Corporation, Detroit, Mich., a corporation of Delaware Filed June 19, 1963, Ser. No. 288,951

2 Claims. (Cl. 321—18)

This invention relates to power conversion devices and, more particularly, to a static alternating waveform generator.

Solid state waveform generators, commonly known as static inverters, find wide use in electronics. A particularly useful application of a device of this type is in the conversion of a low power D.C. signal to a high power periodic waveform. To approximate a sine wave or other periodic waveform, the prior art suggests, for example, various class B amplifier systems and circuits employing magnetic amplifiers. A major disadvantage of the prior art is the inefficiency of the amplification and the resulting power dissipation. It is an object of the present invention to provide an alternating waveform generator which is highly efficient and, therefore, delivers more useable power for its size and weight than the prior art system. In general, this is accomplished by operating the active circuit elements, such as transistors, in a switching mode. In this mode of operation, the active elements are either fully "on" or fully "off" and little time and power is spent in switching from one condition to the other. Therefore, power dissipation and heating during switching is a minimum.

Examples of pror art also suggest the generation of a time varying waveform by adding and subtracting various voltage levels in the proper sequence. This method requires fairly precise time control between the various voltage levels being added as well as the provision and regulation of the voltage levels. Consistent with the object stated above, it is also an object of the present invention to provide a simplified circuit arrangement for generating the desired waveform with a minimum number of components. Accordingly, the invention includes an output stage comprising a plurality of active elements and appropriate control circuitry which is compatible with the switching mode operation stated above to generate a waveform of particular shape by varying, in a predetermined fashion, the duty cycles of the active elements in the output stage. An additional feature of the output configuration is that the output of a single D.C. source may be applied, in a modulated fashion, in opposite directions across the load. To these ends, means are provided to switch the active elements between the off and on states at a vairable rate as dictated by the prescribed waveform. This operation is often known as pulse duration modulation.

It is another object of the present invention to provide precise control of the characteristics of the output waveform. This is accomplished by a comparison technique. More particularly, the invention prescribes means to compare the output waveform of the device to a reference waveform and to produce an error signal. Further means are provided to receive the error signal and to generate appropriate switching signals to energize the output stage elements in the proper sense to return the waveform to the desired form and to thereby reduce the error signal. As was preivously indicated, the direct output of the device is in the form of time modulated pulses. These pulses may be smoothed or averaged by a simple filter or, in the case of a reactive or inductive load, by the load itself.

A further object of the invention is to provide an output stage having three states of operation, i.e., applying the source across the load in two opposite directions, and a substantially short circuit state. More particularly of advantage, are means incorporated into the output stage to permit a net current flow to be maintained in one direction through a reactive or inductive load even after the source has been applied across the load in the opposite direction.

Further objects and advantages will become apparent from a consideration of the embodiment of the invention given in the following specification which is to be taken with the accompanying drawings of which:

Figure 1:
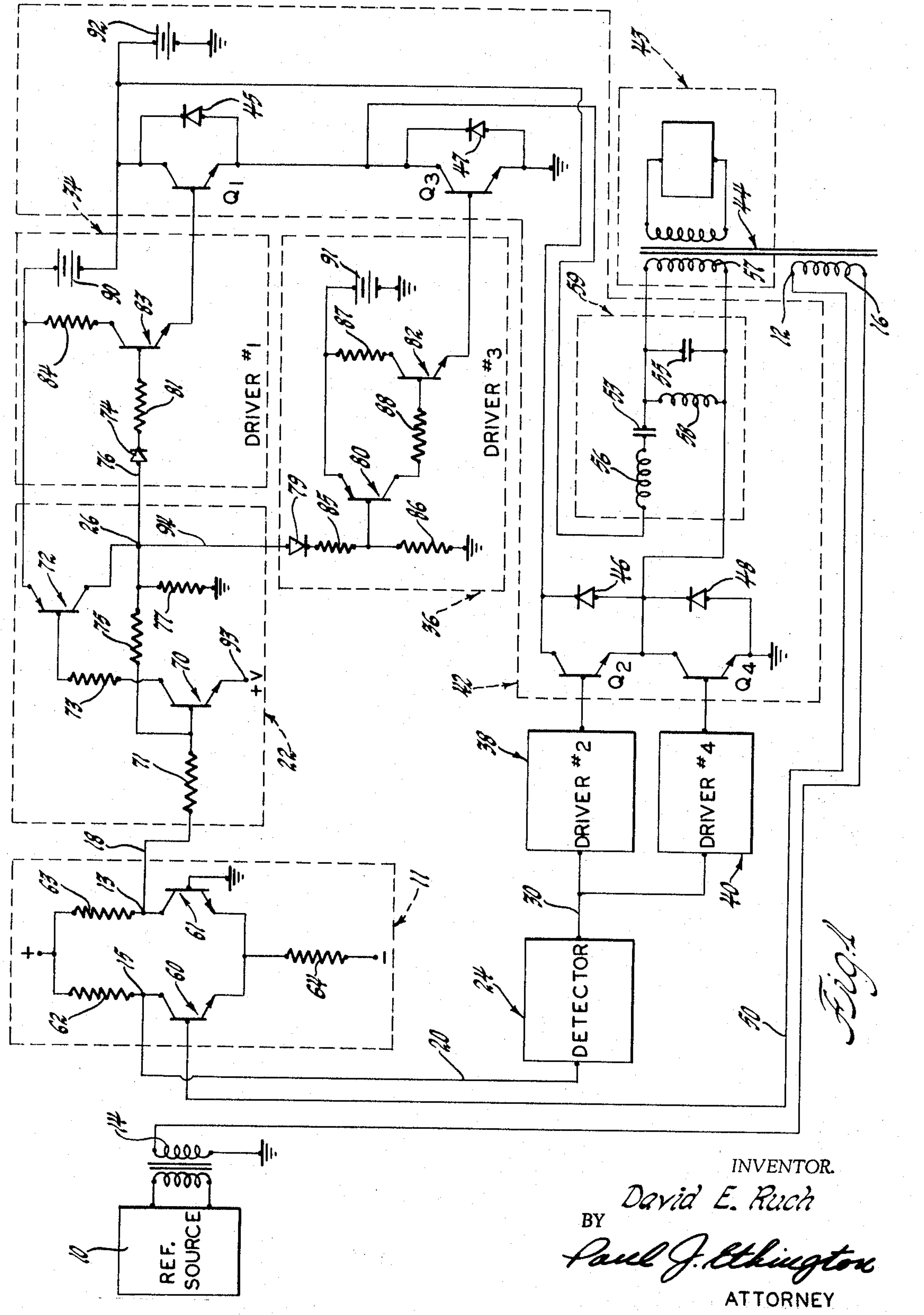
FIGURE 1 is a schematic diagram, partly in block form, of a particular embodiment of the invention.

Referring now to FIGURE 1, a particular embodiment of the invention is set forth in generalized fashion and includes a low power level reference source 10 adapted to produce a waveform of a desired shape to be approximated by the inverter circuit. In the present case, the output of the source 10 is a sine wave and, thus, the high power level output wave of the inverter is also approximately a sine wave. It is to be understood, however, that the invention is not limited to the generation of any single waveform. The output of the source 10 is connected to a comparison point 12 by means of a transmission path including a reference source transformer winding 14. The output of the inverter circuit is also connected to the comparison point 12 by means of a path including a load transformer winding 16. Assuming for the moment that the waveform produced by the reference source 10 is similar to but 180° out of phase from the output signal of the inverter, it can be seen that the result of the comparison of the reference source output and the inverter output is an error signal comprising a component equivalent to the instantaneous difference between the output waveform of the inverter and that waveform which is desired. It is to be understood that this comparison, which is shown in FIGURE 1 as being the result of a direct addition of signals, may be made in a more sophisticated fashion and may also include one or more amplification stages. These means are omitted in FIGURE 1 for the stake of simplicity.

The error signal from the comparison point 12 is routed by means of conductive path 50 to a D.C. differential amplifier 11 which is provided with two outputs 13 and 15. The outputs 13 and 15 of amplifier 11 are routed by means of conductive paths 18 and 20 to detector circuits 22 and 24 respectively. These detector circuits 22 and 24 may take the form of what is commonly known as a level detector or a threshold detector circuit. Detector circuit 22 has an output 26 and circuit 24 has output 30. The function of each of the circuits 22 and 24 is to produce output signals of predetermined character in response to input signals of a predetermined magnitude and polarity. Output point 26 of detector circuit 22 is connected to a first driver circuit 34. Correspondingly, the output 26 of detector circuit 22 is also connected to a driver 36, also designated driver number 3. The output 30 of the detector circuit 24 is connected to the inputs of drivers 38 and 40 respectively. Drivers 38 and 40 are also designated driver number 2 and driver number 4 respectively. The driver circuits 34, 36, 38 and 40 are responsive to input signals of a predetermined character to produce respective output signals for delivery to the active elements of an output stage generally shown at 42. According to the nature of the signals from drivers 34, 36, 38 and 40, the output stage 42 will supply a signal to a load which is positive, negative or zero. Thus, the combinations of the detector circuits and drivers represent logic circuitry which interpret the various error signals from comparison point 12. To summarize briefly, the character, i.e., magnitude and polarity, of the error signals resulting from the comparison at point 12 will be interpreted in the proper channels of the logic arrangement to properly energize the elements of the output stage 42 to control the inverter circuit output in a desired fashion, so as to reduce the error signal.

Examining the output stage 42 in somewhat greater detail, this component is shown in FIGURE 1 to comprise four active elements in the form of NPN transistors labeled $Q_1$, $Q_2$, $Q_3$ and $Q_4$. These transistors are arranged in an H configuration to control the application of power from an output supply source 92 to a load arrangement 43. The load arrangement 43 may include an output transformer as indicated at 44. Defining the output circuit connections, the collector electrodes of transistors $Q_1$ and $Q_2$ are interconnected with the source 92 while the emitter electrodes are connected to opposite sides of the load arrangement 43 via a primary coil 57. In addition, the collector electrodes of transistors $Q_3$ and $Q_4$ are connected to the emitter electrodes of $Q_1$ and $Q_2$ respectively and, therefore, are also across the load. The emitter electrodes of $Q_3$ and $Q_4$ and the negative terminal of the source 92 are commonly connected to ground as indicated.

To form an input circuit to each of the transistors, correspondingly numbered driver circuits have the outputs thereof connected to the input or base electrodes of the various transistors. More particularly, driver circuit 34 has the output thereof interconnected with the base electrode of transistor $Q_1$. Therefore, driver circuit 34, when properly energized from the output 26 of detector circuit 22, is effective to control the conductivity of transistor $Q_1$. Driver circuit 36 has the output thereof connected with the base electrode of transistor $Q_3$. As will subsequently appear, the output 26 of the detector circuit 22 performs a complementary switching action in the driver circuits 34 and 36 such that a signal from detector circuit 22 energizes one of the drivers and deenergizes the other. In a similar fashion the outputs of the driver circuits 38 and 40 are interconnected with the base electrodes of transistors $Q_2$ and $Q_4$ respectively. The driver circuits 38 and 40 operate similarly to driver circuits 34 and 36 to control the conductivity of transistors $Q_2$ and $Q_4$ in accordance with the command signals generated in the detector circuit 24. Diodes 45, 46, 47 and 48 are connected across transistors $Q_1$, $Q_2$, $Q_3$ and $Q_4$ respectively, to permit the direction of curent flow to be maintained for reactive or inductive loads after a voltage state of output stage 42 has been switched.

With respect to the load arrangement 43, it can be seen that voltage across the load may be switched by controlling the conductivity of the transistors such that transistors $Q_1$ and $Q_4$ will contemporaneously conduct while transistors $Q_2$ and $Q_3$ are non-conductive. Voltage reversal is obtained by reversing the conductivity such that $Q_2$ and $Q_3$ conduct while $Q_1$ and $Q_4$ are non-conductive. A third state, that of zero voltage across the load, exists when $Q_3$ and $Q_4$ conduct. As will be subsequently explained, the signals to effect this conductivity control are generated in the detector and driver circuitry of FIGURE 1. The closed loop required for this control is completed by the path 50 interconnecting the load arrangement 43 with the comparison point 12 as previously described.

A brief explanation of the operation of FIGURE 1 will now be made with reference to the output waveforms of FIGURE 2. In this explanation it will be assumed that a positive output is generated across the load arrangement 43 when transistors $Q_1$ and $Q_4$ are "on," i.e., conductive, and $Q_2$ and $Q_3$ "off," i.e., non-conductive. Conversely, a negative output is produced when transistors $Q_2$ and $Q_3$ are "on" and $Q_1$ and $Q_4$ are "off." Assume that at a particular instant the output waveform has acquired a positive amplitude having the value indicated at point 52 of FIGURE 2, line A. At a corresponding time the amplitude of the reference wave generated by source 10 is indicated at a point 54. It can be seen that these points 52 and 54 are of approximately equal ampltiude but opposite polarity. These signal magnitudes are instantaneously compared at point 12. In the event the output signal amplitude at point 52 exceeds, on an absolute basis, the amplitude of the reference waveform at point 54, the resulting error signal is positive indicating that the output signal is larger than desired. This positive error signal is routed to D.C. amplifier 11 via path 50 and from amplifier 11 appropriate signals are sent to detector circuit 22 by means of path 18 and also to detector circuit 24 by means of path 20. It is understood that because of the differential nature of amplifier 11, the signal sent to one of the detectors is a voltage increase while the signal sent to the other detector is a voltage decrease. In the event the error signal is of sufficient magnitude to exceed the threshold level of the detector receiving a voltage signal, which ever one of the detector circuits 22 and 24 is actuated will respond to this error to produce a signal on the output thereof. In the present instance, the signals appearing on output paths 18 and 20 actuate to produce corresponding output signals which energize transistors $Q_2$ and $Q_3$. As previously defined, transistors $Q_2$ and $Q_3$ produce a current in one direction, i.e., from right to left through the load arrangement thereby tending to decrease the magnitude of the output signal appearing across the load. This drives the error signal toward zero with $Q_2$ and $Q_3$ continuing to conduct until the detector 24 is turned off, thereby turning $Q_3$ and $Q_4$ on to provide the shorted state.

In the event the magnitude of the output signal taken at a point 52 of line A is smaller than that of the reference waveform at point 54, the output stage 42 is required to increase the energy across the load. This is accomplished by rendering transistors $Q_1$ and $Q_4$ conductive for a sufficient period to increase the load energy and reduce the error to zero. Accordingly, a comparison of signal amplitudes as per points 52 and 54 produces a negative error signal. The detector circuit 22 is responsive to this negative error signal, providing it is of a sufficient magnitude, to energize output 26. When an increased voltage signal appears on output 26, and a decreased voltage signal appears at 30, driver circuits 34 and 40 drive transistors $Q_1$ and $Q_4$ into conduction, thus, increasing the positive magnitude of the output wave with $Q_1$ and $Q_4$ continuing to conduct until the detector 22 is turned off thereby returning the output stage to the shorted state.

Should the error signal be of insufficient magnitude to exceed any of the threshold levels, $Q_3$ and $Q_4$ are biased to conduct, thus, placing a zero potential across the load.

Figure 2:
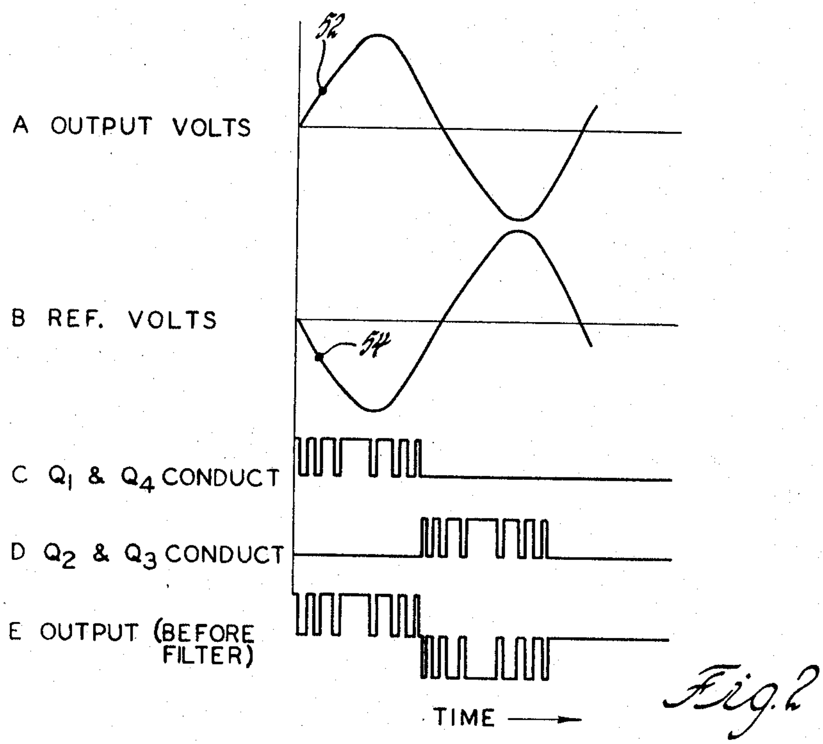
FIGURE 2 is a graph of output waveforms at various points in the circuit of FIGURE 1.

A similar analysis of corresponding points on the output and reference waveforms of FIGURE 2, lines A and B, during the negative half cycle of the output wave indicates that the result of a positive error signal is to render transistors $Q_2$ and $Q_3$ conductive, whereas the result of a negative error signal is to render transistors $Q_1$ and $Q_4$ conductive. This relationship holds true regardless of which half cycle of the output waveform is examined.

During any one of the positive voltage pulses occurring on line C of FIGURE 2, the circuit through the load arrangement is defined as follows: from the source 92 through the collector and emitter of $Q_1$, the load via transformer 44, and the collector to emitter of $Q_4$ and then to ground. Similarly, the circuit during the negative voltage pulses occurring on line D of FIGURE 2 is completed from the source 92 through the collector-emitter circuit of $Q_2$, the load arrangement 43, the collector-emitter circuit of $Q_3$ and then to ground. The diodes 46 and 48 connected across the emitter-collector circuits of transistors $Q_3$ and $Q_4$ provide a short circuit current path around the respective transistors to provide a bilateral circuit which allows current flow in opposite directions. This is necessary to account for the reactive nature of the load arrangement as discussed further below.

Figure 3:
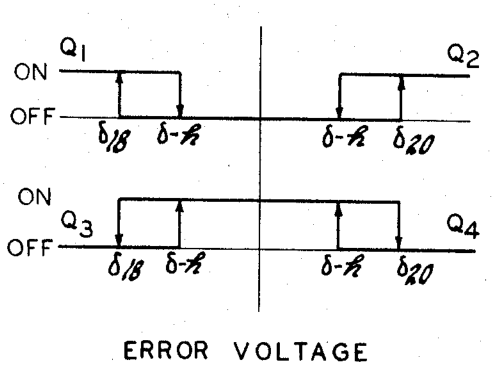
FIGURE 3 is a series of graphs of error voltage versus load voltage for the active elements of the output stage.
Figure 4:
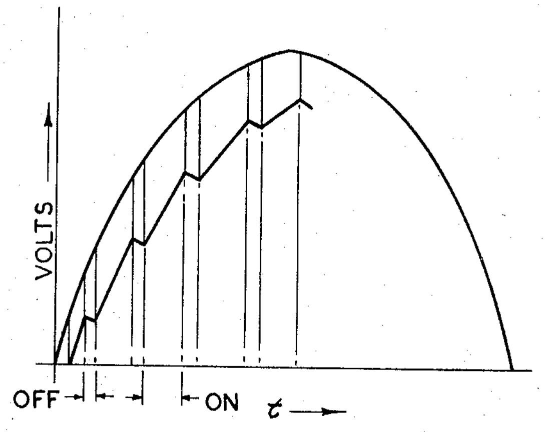
FIGURE 4 is a plot of the output voltage superimposed on a plot of the reference signal.

The duration of the pulses shown in FIGURE 2 and the time between pulses is determined by the hysteresis and threshold designed into the detector circuits 22 and 24. The duration of the pulse increases with increasing hysteresis while the frequency of the pulses decreases with increasing hysteresis as will be shown below. With reference to FIGURE 3, it is seen that when the error on conductor 18 exceeds a threshold error value $\delta$, $Q_1$ is driven on and $Q_3$ off so that the error on conductor 18 decreases to a value of $\delta$ minus the hysteresis $h$. At this time $Q_3$ is turned on and $Q_1$ off, and the error again has a chance to increase toward $\delta-h$. The rate with which the error approaches $\delta-h$ is not constant but decreases as the reference voltage increases toward the supply voltage. This is due to a less negative load line slope with increases in the reference voltage. Thus, if the reference voltage is one fourth the supply voltage and the rate of error decrease is $\alpha$, when the reference is one half of the supply, the rate of error decrease would fall to $0.5\alpha$. This relationship, as shown in FIGURES 2 and 4, causes the pulses produced by the output stage to increase in width with the first 90° of the reference wave and to decrease with the next 90°. Also it is important to note that the error correction rate must always be greater than the rate at which reference signal increases in order that the error can decrease at all. Thus, the error correction rate in the first 90° must not be less than the rate that the reference signal increases in that quadrant.

Referring again to FIGURE 1, a filter circuit 59 is connected between the output stage and the load 43. Filter 59 includes capacitors 53 and 55 and inductors 56 and 58. The inductor 57, which is also the primary coil of the transformer 44, is connected across capacitors 55 and 57. This arrangement forms an effective filter circuit 59 which tends to smooth out ripple produced by the transistors due to the switching mode operation. Thus, the square wave pulses of sinusoidally varying duration shown in FIGURES 2C, D and E, when averaged, approximate a sinusoidal waveform as suggested in FIGURE 4; while FIGURE 4 shows the the aproximation of the first 90° of a sine wave, a similar approximation takes place for the remaining portions of the cycle.

A more specific description of the circuitry of FIGURE 1 will now be made. An overall observation of the circuit indicates that this inverter device is an entirely solid state electronic device. In the circuit of FIGURE 1, a comparison between the output of the reference waveform source 10 and the signal appearing across the load arrangement 43 is amplified in D.C. amplifier 11. The amplifier 11 consists of a pair of NPN transistors 60 and 61. This amplifier is of conventional form in which the collector circuits of the transistors are connected through appropriate resistors 62 and 63 to a positive terminal of a D.C. source as generally indicated. The emitters of transistors 60 and 61 are connected in common to a negative supply through resistor 64. The feedback path 50 is connected to the base of transistor 60 and the base of transistor 61 is grounded. The signal appearing on the collector electrode of transistor 61 is routed by path 18 to the detector circuit 22 consisting of NPN transistor 70, PNP transistor 72 and resistors 71, 73, 75 and 77. The collector of transistor 70 is connected to the base of transistor 72 via resistor 73, and the emitter of transistor 70 is connected to a point of positive reference potential 93 such that the transistor 70 is biased to be non-responsive to signals below a predetermined magnitude. The emitter of transistor 72 is connected to the positive terminal of a supply source 90 and the collector of transistor 72 is connected both to ground across resistor 77 and to the base of transistor 70 as a feedback path via resistor 75.

The output of detector circuit 22 is connected to driver circuits 34 and 36 via conductors 76 and 94 and diodes 74 and 79 respectively. Driver circuit 34 consists of NPN transistor 83, input resistor 81, collector resistor 84, and positive supply 90 of higher potential than the output supply 92. The collector of transistor 72 is connected to the base of transistor 83 via diode 74 and resistor 81. The collector of transistor 83 is connected to positive supply 90 via resistor 84, and the emitter of transistor 83 is connected to the base of $Q_1$ in the output circuit 42. For the sake of simplicity, base leakage paths are not shown in this driver circuit nor in driver circuit 36.

Driver circuit 36 consists of PNP transistor 80, NPN transistor 82, resistors 85, 86, 87 and 88, and a supply 91 of lower potential than that (90) of the driver 34 or of the output stage 42. The collector of transistor 72 is connected by conductor 94 to the base of transistor 80 via diode 79 and voltage dividing resistors 85 and 86. The collector of transistor 80 is connected to the base of transistor 82 across current limiting resistor 88. The emitter of transistor 80 is connected to B+ 91 as is the collector of transistor 82 via resistor 87. The emitter of transistor 82 is connected to the base of $Q_3$ in the output stage 42.

The collector electrode of transistor 60 in D.C. amplifier 11 is interconnected via path 20 with a detector circuit 24, which is similar to detector circuit 22, and also to a second pair of driver circuits 38 and 40, which correspond in circuit form to driver circuits 34 and 36. For the sake of simplicity the details of this circuitry have been omitted.

A brief description of detailed operation will now be given. The first condition to be described obtains when the output sensed in winding 16 of transformer 44 equals the reference signal as sensed by reference winding 41. At this time the circuit is in its "zero" state. Here the potentials at the collectors of transistors 60 and 61 of the D.C. amplifier 11 are beneath the threshold levels required to send transistor 70 in detector 22 or the corresponding transistor in detector 24 into conduction. In this "zero" state transistor 72 cannot conduct, and the collector of transistor 72 is grounded via resistor 77. The base of transistor 80 is, thus, effectively forward biased with respect to the potential of supply 91 so that the resulting emitter-to-base current starts transistor 80 into saturation. The base-to-emitter current through transistor 80 as a result raises the forward base-to-emitter bias across resistor 88 so that transistor 82 goes into saturated conduction. Then the base-to-emitter bias of $Q_3$ of output stage 42 is raised via resistor 87 so that $Q_3$ is also driven into saturation. In the same manner, it can be shown that, for a zero error signal, driver 40 causes $Q_4$ of the output stage 42 to be in saturated conduction. With $Q_3$ and $Q_4$ both conducting, the voltage to the load is zero because the collectors of both $Q_3$ and $Q_4$ are grounded.

The second condition obtains when the load output falls beneath the reference value and the comparison at point 12 yields a positive potential which is applied to the base of transistor 60 via conductor 59. The forward bias of the base-to-emitter junction of transistor 60 is thereby increased. Accordingly, transistor 60 conducts more heavily, and transistor 61 less heavily, due to the constant current requirement through resistor 15. The potential at the collector of transistor 61 is, thus, increased and serves to raise the forward base-to-emitter bias of transistor 70 beyond its threshold level.

Transistor 70 conducts, drawing current from positive supply 90 through the emitter-to-base junction of transistor 72, across resistor 73, and to reference potential 93 via the emitter-to-collector junction of transistor 70. With the transistor 70 in saturated conduction, the potential at its collector is lowered to the reference potential 93 so that the forward emitter-to-base bias of transistor 72 is further increased until transistor 72 is also in full conduction. The potential of the positive supply 90, thus, appears at the collector of transistor 72 and serves to increase the forward bias of the base-to-emitter junction of transistor 83 to drive that transistor into saturation. With transistor 83 in saturation, the base-to-emitter junction of transistor $Q_1$ in the output stage 42 is forward biased by the drop of the positive supply 90 across resistor 84 and the collector-to-emitter of transistor 83. Thereby, $Q_1$ conducts from its positive supply 92 through its collector-to-emitter junction, through filter 59, output winding 57, the collector-to-emitter junction of $Q_4$ and to ground.

Simultaneously with the switching "on" of transistor 83 in the driver circuit 34, the emitter-to-base junction of transistor 80 is reverse biased due to the positive potential of supply source 90 appearing on the collector of transistor 72. Transistor 80, thus, cut off, in turn, cuts off transistor 82 and transistor $Q_3$. In this manner it is seen that $Q_1$ goes "on" at the moment $Q_3$ goes "off."

At this point it is important to note that diodes 74 and 79 assure the complementary operation of $Q_1$ and $Q_3$. When $Q_3$ conducts, there is a leakage path from the source 91 through the emitter-base diode of transistor 80. This positive signal is prevented from reaching the base of transistor 83 by the diode 79. Similarly, diode 74 prevents any leakage signal from supply 90 from reaching the base of transistor 80 and affecting the state thereof. It is understood that similar diode arrangements are employed in the driver circuits 38 and 40.

The "positive" conduction state, described above for the case when the feedback voltage is less than the reference voltage, continues until the difference (error) is somewhat less than the threshold level at which point $Q_3$ and $Q_4$ conduction starts as indicated by the hysteresis charts of FIGURE 3. The turn on and turn off potentials required at the base of transistor 70 are not the same due to the hysteresis introduced by the feedback between the collector of transistor 72 to the base of transistor 70. This hysteresis voltage may be shown to be equal to the ratio of the value of resistor 71 to that of resistor 75 multiplied by the potential of positive supply 90. Hence, by adjusting the values of the resistors 71 and 75, the hysteresis voltage may be set to limit the frequency and error of the inverter. By reducing the hysteresis voltage, the error of the system is reduced but with the result that the frequency at which the output stage must switch to maintain the smaller error is increased. Such increased frequency causes a reduction in total output efficiency since a certain amount of power is lost every time the output stage switches from one of its three states. Yet it should also be noted that the hysteresis voltage is just one factor determining the maximum error. Other factors are the voltage level normally at the input of the detector circuit and the magnitude of the threshold level with respect to the input.

In the above manner it can also be shown that when the error voltage decreases beneath the threshold level minus the hysteresis $(\delta - h)$, $Q_1$ is cut off and $Q_3$ turned on. This causes the output supply source 92 to be disconnected from the output so that the voltage to the supply drops from B+ to zero. However, if the load is of either an inductive or capacitive nature, switching the voltage will not switch the current flowing through the load. In fact, instead of disconnecting this current, it must be allowed to continue to flow to achieve maximum output efficiency. Since this flow will be in the direction opposing the voltage change (i.e., the direction before switching) a separate current path must be provided. It is for this purpose that diodes 45, 46, 47 and 48 are connected across transistors $Q_1$, $Q_2$, $Q_3$ and $Q_4$. Then taking the case where the circuit is switched from its plus voltage stage to its zero state (i.e., conducting transistors $Q_1$ and $Q_4$ and non-conducting transistors $Q_2$ and $Q_3$ are switched so that transistors $Q_3$ and $Q_4$ conduct and transistors $Q_1$ and $Q_2$ do not), the current can continue to flow in the same direction as before switching using the path from ground, through diode 47, the output transformer 57, conducting transistor $Q_4$ and back to ground. Similarly, when the circuit switches from its negative to its "zero" state, the available current path is from ground through diode 48, output transformer 57, the collector-to-emitter of conducting $Q_3$ and back to ground.

The diodes 45 and 46 come into use when the output switches from its positive to its negative state or vice versa. With the former, the current path would be from ground, through diode 47, the load transformer 57, diode 47 to the positive side of source 92. For the latter case, the path would be from ground, through diode 48, load winding 57, diode 45 to source 92.

It is to be understood that while the invention has been described with reference to a specific embodiment thereof, various modifications and substitution of equivalent circuitry are possible to the schematic circuit without departing from the true spirit and scope of the invention. For a definition of the invention reference should be had to the appended claims.

What is claimed is:

1. Apparatus for approximating a desired waveform across a load comprising a load circuit, a source of direct voltage, an H-configuration output stage comprising first and third transistors having the output electrodes thereof connected in series across the source, second and fourth transistors having the output electrodes thereof connected in series across the source, the load circuit having opposite ends thereof connected to the junctions of the first and third, and second and fourth transistors, respectively, first and second driver circuits respectively connected to the input electrodes of the first and second transistors and responsive to trigger signals to render the first and second transistors fully conductive, said first and second driver circuits including means biasing the first and second transistors normally non-conductive, third and fourth driver circuits respectively connected to the input electrodes of the third and fourth transistors and responsive to trigger signals to render the third and fourth transistors non-conductive, said third and fourth driver circuits including means biasing the third and fourth transistors normally fully conductive, first detector means for producing a first trigger signal in response to a first error signal, means connecting the first trigger signal to the first and third driver circuits, second detector means for producing a second trigger signal in response to a second error signal, means connecting the second trigger signal to the second and fourth driver circuits, a differential amplifier having complementary outputs for producing said first and second error signals in response to signals of respectively opposite polarity, the complementary outputs being connected to the first and second detector means respectively, and comparison means for comparing the signal developed across the load circuit with a desired waveform and producing output signals of opposite polarity indicating the substantially instantaneous difference between the load signal and said waveform, means connecting the output signals to said differential amplifier.

2. Apparatus as defined in claim 1 further including respective diodes connected across the output electrodes of the first, second, third and fourth transistors to provide a path for continued current flow through the load after a transistor is rendered non-conductive.

References Cited by the Examiner

UNITED STATES PATENTS

| | | | |
|---|---|---|---|
| 2,959,725 | 11/1960 | Younkin | 321—45 X |
| 3,010,062 | 11/1961 | Van Emden | 321—18 |
| 3,074,008 | 1/1963 | McPhail et al. | |
| 3,078,380 | 2/1963 | Ingman. | |
| 3,089,075 | 5/1963 | Lee | 321—45 |
| 3,233,161 | 2/1966 | Sikorra | 321—45 X |
| 3,237,081 | 2/1966 | Martin | 321—18 |
| 3,246,226 | 4/1966 | Geisler et al. | 321—45 X |

JOHN F. COUCH, *Primary Examiner.*

W. M. SHOOP, *Assistant Examiner.*